United States Patent [19]

Chesworth et al.

[11] Patent Number: 4,826,525

[45] Date of Patent: May 2, 1989

[54] PROCESS OF COATING GLASS FOR REHEATING

[75] Inventors: Peter Chesworth; Martin Lowe, both of Lancs, England

[73] Assignee: Pilkington plc, St. Helens, England

[21] Appl. No.: 223,943

[22] Filed: Jul. 25, 1988

[30] Foreign Application Priority Data

Jul. 29, 1987 [GB] United Kingdom ............... 8717959

[51] Int. Cl.$^4$ ....................... C03C 17/34; C03B 23/02
[52] U.S. Cl. ..................................... 65/60.2; 65/60.4; 65/60.5; 65/62; 65/104
[58] Field of Search ...................... 65/60.2, 60.4, 60.5, 65/62, 104

[56] References Cited

U.S. PATENT DOCUMENTS

| | | | |
|---|---|---|---|
| 3,762,902 | 10/1973 | Wagner et al. ..................... | 65/62 X |
| 3,793,167 | 2/1974 | Glaser ............................... | 65/60.2 X |
| 4,329,379 | 5/1982 | Terneu et al. ..................... | 65/60.2 X |
| 4,692,389 | 9/1987 | Gillery et al. ..................... | 65/60.2 X |
| 4,715,879 | 12/1987 | Schmitte et al. .................. | 65/60.2 X |
| 4,749,397 | 6/1988 | Chesworth et al. .............. | 65/60.4 X |

Primary Examiner—Arthur Kellogg
Attorney, Agent, or Firm—Burns, Doane Swecker & Mathis

[57] ABSTRACT

A bent and/or toughened coated glass is produced by subjecting glass having a coating comprising at least one metal having an atomic number of 22 to 29 and a thin layer of aluminum applied over said coating to a bending and/or toughening cycle in which the coated glass is heated to a temperature above the softening point of the glass.

The invention is useful for the production of bent and-/or toughened solar control glasses, low emissivity glasses (when the metal used is copper) and mirrors.

19 Claims, No Drawings

PROCESS OF COATING GLASS FOR REHEATING

BACKGROUND OF THE INVENTION

The invention relates to coated glass and, in particular, to a method of producing bent and/or toughened glass having a coating comprising at least one metal having an atomic number of 22 to 29.

Such coatings are used for their reflective properties, and find application as solar control coatings, as mirror coatings and also, especially in the case of copper (atomic number 29), as mirror coatings.

Unfortunately, when attempts are made to bend or toughen glass carrying such a reflective coating, there is normally a substantial loss in the heat and light reflecting properties of the coated glass. Thus, when glass with such a coating is required in bent or toughened form, it is necessary to bend or toughen the glass and then coat the bent or toughened glass. It would be desirable to have a reflective coating which, when applied to glass, would substantially retain its reflection properties on bending or toughening the coated glass. We have now found that this may be achieved by applying a thin layer of aluminium over a coating comprising at least one metal having an atomic number in the range 22 to 29.

SUMMARY OF THE INVENTION

According to the present invention there is provided a method for the production of bent and/or toughened coated glass which comprises providing glass having a coating comprising at least one metal having an atomic number of 22 to 29 and a thin layer of aluminium applied over said coating, and subjecting the coated glass to a bending and/or toughening cycle in which it is heated to a temperature above the softening point of the glass.

The coating comprises a layer of at least one metal of atomic number 22 to 29, that is titanium, vanadium, chromium, manganese, iron, cobalt, nickel or copper. The metal may be in the form of an alloy or a metal compound, for example, the coating may comprise a layer of stainless steel and/or a layer of titanium nitride.

DETAILED DESCRIPTION OF THE INVENTION

The invention is especially, but not exclusively, applicable to solar control coatings, especially solar control coatings comprising a layer of stainless steel, a layer of chromium nitride or titanium nitride, or a layer of copper.

The invention is also applicable to mirror coatings in which a thicker metal layer is used such that the coated glass has a light transmission of less than 1%. Such mirror coatings are usually of chromium, chromium nickel alloy, stainless steel or titanium.

Coatings of copper are useful as low emissivity (high infra-red reflectivity) coatings, for retaining heat within a glazed enclosure, or, when the copper layer is somewhat thicker, as solar control coatings.

The bending and/or toughening step, in which the glass is heated to a temperature above its softening point, may be performed in generally known manner. When the glass substrate is of soda lime silica glass, it may be heated in air at a temperature in the range 570° C. to 670° C., bent in a mould of desired curvature and annealed, or heated in air at a temperature in the range 600° C. to 670° C., optionally bent, and rapidly cooled to toughen it.

When coated glass is bent and/or toughened in air in accordance with the invention, the light transmission of the coated glass increases, presumably as a result of oxidation of the aluminium to aluminium oxide.

The amount of aluminium required will depend on the bending and/or toughening cycle to which the glass is to be subjected. In general, the longer the coated glass surface is hot, and the higher its temperature, the more aluminium is required. The aluminium will usually be used in an amount equivalent to an aluminium layer having a thickness in the range 10 nm to 40 nm. In most cases the aluminium will be used in an amount equivalent to an aluminium layer having a thickness of at least 15 nm, and it will usually be sufficient to apply the aluminium in an amount equivalent to an aluminium layer having a thickness of up to 35 nm. In one embodiment of the invention, the aluminium is applied over the coating in an amount equivalent to an aluminium layer having a thickness in the range 10 nm to 20 nm.

An additional layer, for example of metal oxide, serving as an anti-reflection and/or protective layer, may be provided over the coating comprising a metal having an atomic number of 22 to 29. In this case, the aluminium layer may be provided above or below the additional layer (or may be divided and provided as two separate sub-layers, one above the additional layer and one below the additional layer).

Similarly, an intermediate layer may be provided between the coating comprising a metal of atomic number 22 to 29 and the glass as a primer layer, to improve the adhesion of the coating to the glass, and/or as an anti-reflection layer.

The invention is illustrated but not limited by the following Examples. In each of the Examples, unless otherwise stated, a pane of 6 mm clear float glass was prepared for coating by washing and drying and loaded into a Nordiko NS 2500 dc planar magnetron sputtering apparatus.

EXAMPLE 1

A solar control coating comprising a first layer of stainless steel and a second layer of titanium nitride was deposited on a pane of float glass. The stainless steel layer was approximately 7 nm thick and was deposited by sputtering a stainless steel (an alloy of approximately 12% chromium, 12% nickel and the balance iron) cathode in an argon atmosphere at a pressure of $3 \times 10^{-3}$ torr. The titanium nitride layer had a thickness of approximately 25 nm and was deposited by sputtering a titanium cathode in a nitrogen atmosphere at a pressure of $3 \times 10^{-3}$ torr. Finally, aluminium in an amount equivalent to a layer having a thickness in the range 10 nm to 20 nm was sputtering over the titanium nitride from an aluminium cathode in the presence of an argon atmosphere at a pressure of $3 \times 10^{-3}$ torr to provide an outer aluminium layer.

The coated glass was suspended on tongs in a furnace maintained at 720° C. and withdrawn when it reached a temperature of approximately 650° C. Immediately after removal of the glass from the furnace, it was rapidly cooled and toughened by blowing air at an ambient temperature on to the glass surface.

The optical properties of the coated glass were then measured (a) with the coated side towards the radiation source and (b) with the coated side away from the radiation source. The results obtained are shown below, with the comparable figures for a similar untoughened coated glass made without the aluminium layer given in brackets.

| Orientation | Light transmission % | Light reflection % | Solar heat reflection % | Total solar heat transmission % |
|---|---|---|---|---|
| Coating towards source | 18(20) | 28(33) | 38(35) | 30(33) |
| Coating away from source | 18(20) | 22(24) | 24(20) | 28(34) |

The colour co-ordinates of the transmitted and reflected light are given below:

| | Transmission | | Reflection | |
|---|---|---|---|---|
| | a | b | a | b |
| Coating towards source | −2.4(−1.5) | −1.4(+2.5) | +2.4(+1.0) | +11.5(+1.5) |
| Coating away from source | −2.4(−1.5) | −1.4(+2.5) | +0.3(−1.5) | −4.3(−6.0) |

It will be seen that the light transmission and total solar heat transmission of the toughened glass according to the invention is comparable with that of the untoughened glass. The colour of the coloured toughened and untoughened coated glasses was similar in reflection from the glass side and in transmission, but there was a significant difference in reflection from the coated side. However, if the glass is glazed with the coated side towards the interior of the building, it may be possible to use toughened and untoughened coated glasses together in a single facade without the difference in colour being important in practice.

The untoughened coated pane (for which the optical properties are given in brackets) was then subjected to a toughening process as described above. The light transmission of the coated pane increased to 60% on toughening, with a corresponding substantial increase in the solar heat transmission of the coated glass and decrease in the heat and light reflected by the glass.

EXAMPLE 2

A solar control coating of titanium nitride approximately 30 nm thick was deposited on a pane of float glass by sputtering from a titanium cathode in the presence of nitrogen at a pressure of $3 \times 10^{-3}$ torr. Aluminium, in an amount equivalent to a layer having a thickness in the range 10 nm to 20 nm, was sputtered over the titanium nitride from an aluminium cathode in the presence of an argon atmosphere at $10^{-3}$ torr to provide an outer aluminium layer. The coated pane was then toughened as described in Example 1 above, and the optical properties of the toughened coated pane were measured from the glass side. It was found to have a light transmission of 30% and a solar heat transmission of 45%.

EXAMPLE 3

The procedure of Example 2 was repeated, but with titanium nitride layer deposited to a thickness of approximately 80 nm. The coated pane was found, on toughening, to have a light transmission of 16% and a solar heat transmission of 30% (measured from the glass side).

EXAMPLE 4

In this Example, a pane of 6 mm float glass was prepared for coating by washing and drying and loaded into a Leybold Heraeus laboratory plant for dc magnetron sputtering. An optically dense mirror coating approximately 60 nm thick (transmission of coated glass less than 1%) was deposited by sputtering from a chromium target in an argon atmosphere at a pressure of $5 \times 10^{-3}$ torr. An aluminium layer approximately 20 nm thick was then sputtered over the mirror coating from an aluminium target in an argon atmosphere at a pressure of $5 \times 10^{-3}$. The deposition of the aluminium layer on top of the chromium coating did not affect the visible light reflection of the chromium coating (measured from the glass side).

The coated glass was then subjected to a toughening cycle in which it was heated at 670° C. in a laboratory furnace for 5 minutes and then withdrawn and rapidly cooled. After toughening the coated glass was found to have a visible light reflection of 53% (measured from the glass side), indicating that the coating with an aluminium overlayer is suitable for use as a vehicle rear view mirror.

The humidity resistance of the toughened coated glass was tested in a humidity cabinet at a temperature of 40° C. and a relative humidity of 100%; no damage to the coating was observed.

EXAMPLE 5

As in Example 4, a pane of 6 mm clear float glass was prepared for coating by washing and drying and loaded into a Leybold Heraeus laboratory plant for dc magnetron sputtering.

A stainless steel (DIN 1.4401) coating, suitable for use in a reflective spandrel panel, approximately 80 nm thick, was deposited by sputtering from a stainless steel target under an argon atmosphere, and a layer of aluminium approximately 30 nm thick was sputtered over the stainless steel coating from an aluminium target under an argon atmosphere. The glass was toughened by heating in air and cooling rapidly. After toughening, the coated glass was found to have a visible light reflection of 39% (measured from the glass side) and a light transmission of less than 1%. The sample was subjected to the humidity test described in Example 4 and found to be undamaged.

EXAMPLES 6 TO 9

In the following series of Examples, carried out using a Nordiko NS 2500 dc magnetron sputtering plant, the metal and metal alloy layers were sputtered from corresponding cathodes under argon at a pressure of $2 \times 10^{-3}$ torr. After deposition, the coated glasses were toughened as described in Example 1.

The layers deposited in each case, and the light transmission of the coated glass (measured from the glass side), before and after toughening, are shown in Table 1. The coatings are all useful as solar control coatings, and retain high reflectivities for visible light and solar heat when the glass substrates are toughened.

A comparison of Examples 7 and 8 shows a significant increase in the light transmission of the coated glass resulting from inclusion of a stannic oxide anti-reflection layer over the solar control coating of Inconel. Similarly, a comparison of Examples 8 and 9 shows a smaller, but still significant, increase in light transmission resulting from the inclusion of an anti-reflection tin oxide layer intermediate between the solar control layer and the glass.

In Example 7, the aluminium layer is divided into two sub-layers above and below the stannic oxide layer. Dividing the total aluminium used in this way is found to reduce the tendency to formation of haze in the toughened product, and provides a toughened product of improved appearance to that obtained by using the same total amount of aluminium in a single layer.

EXAMPLES 10 AND 11

In each of these Examples, a pane of clear 6 mm float glass was prepared for coating by washing and drying and loaded into an Airco ILS 1600 dc magnetron sputtering apparatus. A solar control coating comprising a layer of stainless steel (approximately 12% chromium, 12% nickel and the balance iron) was sputtered from a stainless steel cathode under an argon atmosphere at a pressure of $4 \times 10^{-3}$ torr.

TABLE 1

| Example | 6 | 7 | 8 | 9 |
|---|---|---|---|---|
| Intermediate layer | — | — | — | 40 nm stannic oxide |
| Solar control coating | 15 nm Inconel[1] | 17 nm Inconel[1] | 10 nm stainless steel[2] | 10 nm stainless steel[2] |
| Aluminium (sub-)layer | 15 nm | 15 nm | 20 nm | 20 nm |
| Metal oxide layer | — | 40 nm stannic oxide | — | — |
| Aluminium (sub-)layer | — | 7.5 nm | — | — |
| Light transmission (before toughening) | 3% | 4% | 5% | 5% |
| Light transmission (after toughening) | 17% | 32% | 18% | 22% |

[1]an alloy of 70% nickel, 12% chromium and the balance iron
[2]an alloy of 12% nickel, 12% chromium and the balance iron In Example 10, a layer of aluminium 17.5 nm thick was sputtered over the solar control coating from an aluminium cathode under an argon atmosphere at a pressure of $4 \times 10^{-3}$ torr. The coated glass, which was found to be highly reflective and have a light transmission of about 10% was subjected to a toughening cycle as described in Example 1. The glass retained retained a high degree of reflectivity, while its light transmission was found to have increased from 10% to 19%.

In Example 11, a sub-layer of aluminium 12.5 nm thick was sputtered over the solar control coating from an argon atmosphere at a pressure of $4 \times 10^{-3}$ torr. A layer of stannic oxide 40 nm thick was reactively sputtered onto the aluminium layer from a tin cathode in an oxygen atmosphere at a pressure of $4 \times 10^{-3}$ torr, and a further sub-layer of aluminium 7.5 nm thick was sputtered over the stannic oxide layer in a similar manner to the first aluminium sub-layer. The coated glass was then subjected to the toughening cycle described in Example 1. The coated glass was found to retain a high degree of reflectivity on coating on toughening, while the light transmission (measured from the glass side), increased from 16% to 36%. Comparing Examples 10 to 11, it is notable that inclusion of the tin oxide layer has increased the light transmission of the product. Moreover, the product of Example 11, in which the total aluminium is split into two aluminium sub-layers was found to have a reduced level of haze when compared to the product of Example 10.

EXAMPLES 12 AND 13

In these Examples, which illustrate the use of aluminium over a coating of copper, the metal layers were deposited by sputtering from the corresponding metal cathode under an argon atmosphere at a pressure of $2 \times 10^{-3}$ torr; the tin oxide layers were deposited by sputtering from a tin cathode under an oxygen atmosphere at a pressure of $2 \times 10^{-3}$ torr. In Example 12, the following layer sequence was deposited:

| | |
|---|---|
| stannic oxide | 40 nm |
| copper | 10 nm |
| aluminium | 12-16 nm |
| stannic oxide | 40 nm | the coated glass had a light transmission of about 45% (a corresponding coating, without the aluminium layer, had a light transmission of about 70% and an emissivity of about 0.1).

The coated glass was subjected to the toughening cycle described in Example 1, and the toughened coated glass was found to have a light transmission of about 70%, a visible light reflection of 6% (measured from the glass side) and an emissivity of about 0.15. It will be noted that the light transmission and emissivity are similar to the values obtained with the untoughened coating without the aluminium layer. Although the reflectivity for visible light is only 6% (because the copper layer is thin given a high light transmission), the reflectivity in the infra red region is higher giving a product useful for its low emissivity properties.

Example 13 was similar to Example 12, except that the thickness of the copper layer was increased to 20 nm to provide a solar control coating. The toughened glass product was found to have a light transmission of about 48%, a light reflection (measured from the glass side) of 23% and an emissivity of about 0.08.

The coatings of Examples 12 and 13 were analysed to determine the layers present in the toughened, coated glass. Aluminium oxide layers of similar thickness (14 nm) were detected both above and below the copper layer, indicating that migration of aluminium had occurred through the copper layer during the toughening cycle.

EXAMPLES 14 TO 16

In these Examples, which relate to the production of solar control coatings of titanium nitride, or stainless steel and titanium nitride, the coatings were applied by dc magnetron sputtering in a commercial three chamber in-line sputtering plant supplied by Airco Solar Products. The metal layers were applied by sputtering from the corresponding metal cathode under an argon atmosphere at a pressure of $3 \times 10^{-3}$ torr; the titanium nitride layers were applied by sputtering from a titanium cathode under a nitrogen atmosphere at a pressure of $3 \times 10^{-3}$ torr.

The composition of the products, and their optical properties (measured from the glass side), are set out in Table 2. The products of these Examples correspond to commercially available untoughened solar control products (which do not have the aluminium layers) and the optical properties of the commercial products are given in brackets for comparison.

TABLE 2

| Example | 14 | 15 | 16 |
|---|---|---|---|
| Solar control coating | 50 nm titanium nitride | 39 nm titanium nitride | 11 nm stainless steel[1] 33 nm titanium nitride |
| Aluminium layer | 35 nm | 25 nm | 32 nm |
| Light transmission | 19(20) | 28(30) | 13(20) |
| Light reflection | 20(23) | 15(15) | 24(22) |
| Direct solar heat transmission | 15(15) | 20(20) | 11(15) |
| Solar heat reflection | 22(21) | 18(17) | 24(16) |
| Solar heat absorption | 63(64) | 62(63) | 65(69) |
| Total solar heat transmission | 31(33) | 37(38) | 27(34) |
| Emissivity | 0.41 | 0.47 | 0.31 |

[1] approximately 12% chromium, 12% nickel and the balance iron

The coatings generally retained high reflectivity (comparable with the commercially available untoughened products) for both visible light and heat on toughening, so that they are useful as bendable and toughenable solar control products.

Attempts to replace the aluminium used in the method of the present invention by other metals (for example, titanium) were not successful. Aluminium appears to be especially effective in protecting coatings comprising metals of atomic number 22 to 29 during bonding or toughening.

I claim:

1. A method for the production of bent and/or toughened coated glass which comprises providing glass having a coating comprising at least one metal having an atomic number of 22 to 29 and a thin layer of aluminium applied over said coating, and subjecting the coated glass to a bending and/or toughening cycle in which it is heated to a temperature above the softening point of the glass.

2. A method according to claim 1 wherein the coating is a solar control coating.

3. A method according to claim 1 wherein the coating comprises at least one metal having an atomic number of 22 to 28.

4. A method according to claim 2 wherein the solar control coating comprises a layer of stainless steel.

5. A method according to claim 2 wherein the solar control coating comprises a layer of titanium nitride.

6. A method according to claim 1 wherein the coating is of copper.

7. A method according to claim 1 wherein the coating is of chromium, chromium nickel alloy, stainless steel or titanium.

8. A method according to claim 7 wherein the coating is a mirror coating such that the coated glass has a light transmission of less than 1%.

9. A method according to claim 1 wherein the aluminium is applied over said coating in an amount equivalent to an aluminium layer having a thickness in the range 10 nm to 40 nm.

10. A method according to claim 9 wherein the aluminium is applied over said coating in an amount equivalent to an aluminium layer having a thickness of at least 15 nm.

11. A method according to claim 9 wherein the aluminium is applied over said coating in an amount equivalent to an aluminium layer having a thickness of up to 35 nm.

12. A method according to claim 9 wherein the aluminium is applied over said coating in an amount equivalent to an aluminium layer having a thickness in the range 10 nm to 20 nm.

13. A method according to claim 1 wherein the coated glass substrate is of soda lime silica glass which comprises heating the coated glass in air to a temperature in the range 570° C. to 620° C., bending it in a mould of desired curvature, and annealing the bent glass.

14. A method according to claim 1 wherein the coated glass substrate is of soda lime silica glass which comprises heating the coated glass in air at a temperature in the range 600° C. to 670° C., optionally bending the glass and rapidly cooling the glass to toughen it.

15. A method for the production of bent and/or toughened coated glass which comprises providing glass having a solar control coating comprising at least one metal having an atomic number of 22 to 28 and a thin layer of aluminium applied over said coating, and subjecting the coated glass to a bending and/or toughening cycle in which it is heated to a temperature above the softening point of the glass.

16. A method according to claim 15 wherein the aluminium is applied over said coating in an amount equivalent to an aluminium layer having a thickness in the range 10 nm to 40 nm.

17. A method according to claim 15 wherein the aluminium is applied over said coating in an amount equivalent to an aluminium layer having a thickness in the range 10 nm to 20 nm.

18. A method according to claim 15 wherein the coated glass substrate is of soda lime silica glass which comprises heating the coated glass in air to a temperature in the range 570° C. to 620° C., bending it in a mould of desired curvature, and annealing the bent glass.

19. A method according to claim 15 wherein the coated glass substrate is of soda lime silica glass which comprises heating the coated glass in air at a temperature in the range 600° C. to 670° C., optionally bending the glass and rapidly cooling the glass to toughen it.

* * * * *